Patented Feb. 6, 1923.

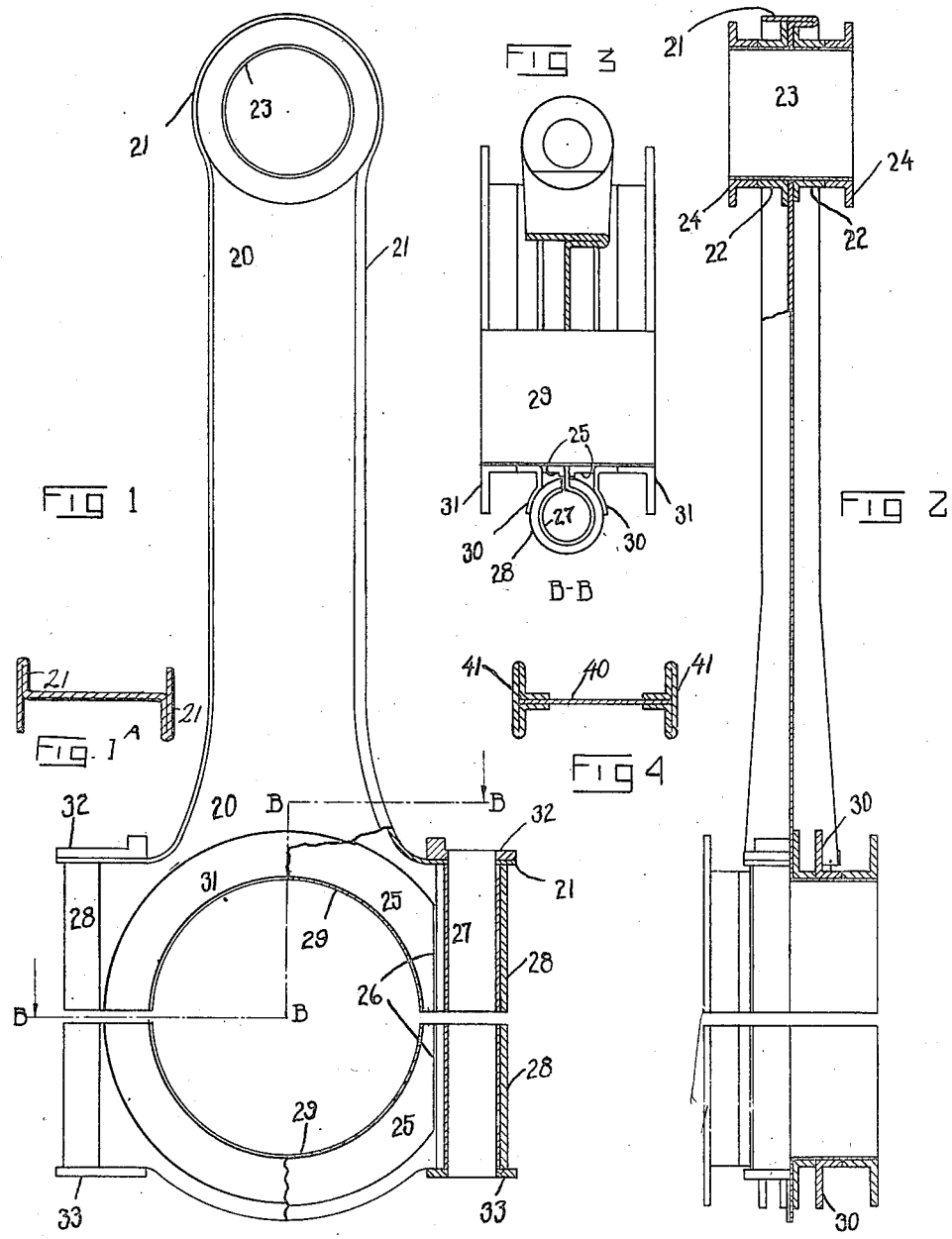

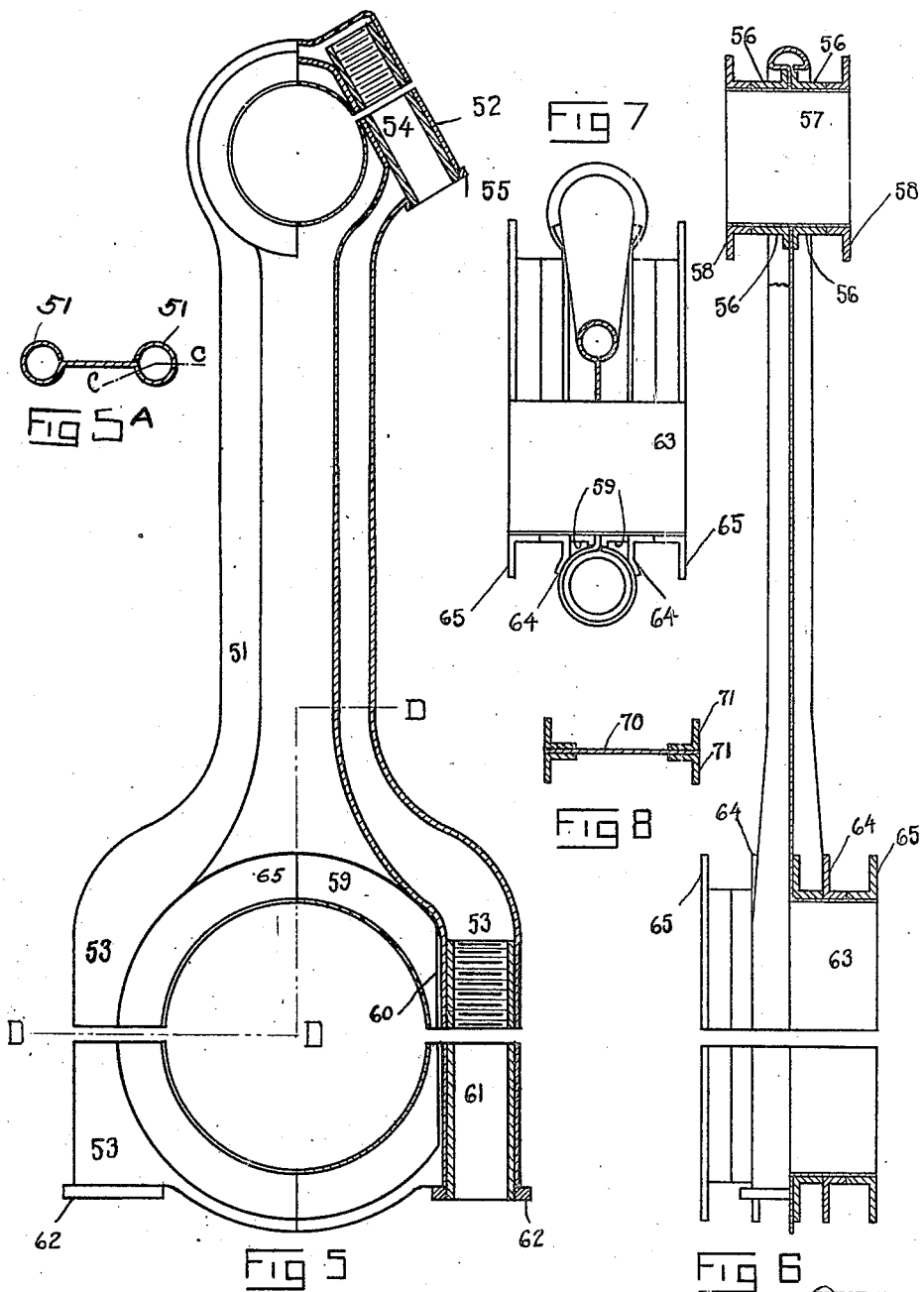

1,444,471

UNITED STATES PATENT OFFICE.

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING ROD.

Application filed April 13, 1917. Serial No. 161,729.

*To all whom it may concern:*

Be it known that I, HEBRON BERNARD LAYMAN, a citizen of the United States, and residing at New York, in the county of New York and State of New York, have invented certain new and useful Improvements in Connecting Rods, of which the following is a specification, such as will enable those skilled in the art to which it appertains to make and use the same.

This invention relates to built-up connecting rods, links, levers and the like, especially sheet metal connecting rods.

The purpose of this invention is to simplify the manufacture of sheet metal connecting rods; to decrease the weight thereof; to decrease the cost and the number of parts to be worked upon and handled; to provide an improved form of crank head having integral bolt bosses, and to provide a light weight connecting rod having such a form of one-piece rod shell as shall be cheap and easy to manufacture. Other objects will appear hereafter in the specification and claims readily discernible to those skilled in the art.

By way of example I show in—

Fig. 1 a partly broken side elevation of a connecting rod embodying features of the invention.

Fig. 1ª is a cross section of the shank of the rod of Fig. 1.

Fig. 2, a side elevation, partly sectioned and partly broken away, of the rod in Fig. 1.

Fig. 3 is a section on the line B—B of Fig. 1.

Fig. 4 is a cross section of modified form of shank.

Fig. 5 is a side elevation of another connecting rod embodying features of the invention, partly sectioned on the line C—C of the cross section of the shank.

Fig. 5ª is a section of the shank of the rod in Fig. 5.

Fig. 6 is a side elevation partly sectioned and partly broken away of the rod in Fig. 5.

Fig. 7 is a section on the line D—D of Fig. 5.

Fig. 8 is another modified form of shank.

In Figs. 1, 1ª, 2 and 3, 20 is a connecting rod shell having an integral flange 21 extending substantially around the rod thereby forming a double T section for the shank of the rod. This shell is apertured in one end, the smaller end, to admit a piston pin, and is provided with flanged cuffs 22 secured to each side thereof, co-operating to form a piston pin boss. Within these cuffs is fitted a liner bushing 23, on which are mounted two additional flanged cuffs 24, which complete the length of the piston pin boss.

In practice I prefer to make all these flanged cuffs of relatively stiff or non-ductile metal, and the liner bushing 23 of relatively soft or ductile material. In the process of building up the rod, I use the liner bushing 23 as a tubular rivet, spinning over the ends thereof to secure the flanged cuffs together and to the rod shell, for the process of brazing or fusing which later occurs.

The larger or crank end of the rod is apertured to admit a crank pin. To each side of the shell I unite a flanged cuff 25, the flange of which is cut away as designated at 26 in Fig. 1. The rod shell 20 is provided with integral bolt bosses 27, made by forming or curling the metal of the shell 20 at opposite sides of the crank pin boss. Over these bolt bosses 27 I fit tubular reinforcements 28, which in turn are united to the sheared flanges of the flanged cuffs 25. Within the flanged cuffs 25 I fit a liner bushing 29, which, like the liner bushing 23 of the piston end, I prefer to make of soft material and use as a tubular rivet to secure together all the cuffs or bushings on the crank end. On this liner bushing I assemble two additional flanged cuffs 30, which contact with the bolt boss reinforcements 28 at opposite sides of the boss, and unite it with the crank pin boss and substantially reinforce it. Finally, the length of the crank pin boss is completed by the addition of flanged cuffs 31.

The bolt bosses are provided at each end thereof with reinforcing washers or flanges, which form seats for the nuts and bolt heads of the cap bolts not here shown. These bolt boss washers are designated 32 at the rod end of the boss, where they are provided with lips to restrain the bolts from turning, and 33 at the cap end of the boss.

In practice I first form the rod shell and then provide the different cuffs or bushings shown, then I assemble these parts to the shell as described, after which, by immersing the ends of the shell in molten alloy of metals, I fuse or braze these small parts together and to the rod shell. Thereafter, I machine the crank and piston pin and bolt bosses, and finally cut the cap from the rod.

In Fig. 4 I show a modified form of shank composed of a flat member 40 having applied T-shaped flanges 41, as distinguished from the integral flanges of the shank of the three preceding figures. To form the T-shaped flanges integral with the rod shell, requires that rather ductile metal should be employed, whereas by applying the flanges as shown in Fig. 4, I may make the plate 40 of relatively stiff and non-ductile metal, the applied reinforcing flanges 41 being made from soft or ductile metal.

In Figs. 5, 5ª, 6 and 7, 50 is a one piece sheet metal shell of a modified form of connecting rod, employing a shank of dumb-bell cross section, comprising an integral tubular reinforcement 51 which extends entirely around the rod, except at the bottom of the cap, forming a pinch bolt boss 52 at the piston end, and cap bolt bosses 53 at the crank end of the rod. The pinch bolt boss is provided with a lining 54, which is threaded for part of its length, and provided with a seat 55 to receive a cap screw, and is sawn in two to allow it to pinch the piston pin.

The shell is apertured at the piston end and provided with cuffs and bushings 56, 57 and 58, corresponding with the cuffs and bushings 22, 23 and 24 of previous figures. The crank end of the shell is provided with flanged cuffs 59, having flanges sheared at 60 to join with and reinforce the bolt bosses 53, which in turn are reinforced interiorly with threaded ferrules 61, having an applied seat 62 to accommodate the head of a cap screw. The crank pin boss is composed of the flanged cuffs or bushings 59 and the additional bushings 63, 64 and 65, which correspond with the members 29, 30 and 31 of Figs. 1 to 3.

Fig. 8 is a modified form of shank employing a central plate 70, reinforced by four rolled angles 71, which are united therewith in the process of brazing or fusing referred to. Where the shank reinforcement is composed of applied members such as 71, I braze or fuse the parts by immersing the entire rod in the molten alloy, but where the reinforcement is integral, as shown in Figs. 1 and 5, I need only immerse the ends of the rod. This results in a saving in cost, time and equipment.

Heretofore, I have used the word "shell" in referring to the main part of the connecting rod. By "shell" I mean the shank portion and one or both end portions integral therewith, exclusive of cap or flanged bushings, or liner bushings, or bolt boss bushings, or shank reinforcement, or similar small parts.

My use of the word "shell" will apply with equal force to connecting rods with or without caps. Rods of the latter class I have described in U. S. Patent No. 1,176,300.

Where I use the term "sheet metal" hereinafter in the claims, I wish it understood that I mean any form of metal which partakes of the nature and characteristics of sheet metal, as distinguished from castings and forgings.

Having fully described my invention, what I claim as new and desire to secure by Letters Patent, is:—

1. A one-piece sheet metal connecting rod shell having a shank with a single transverse wall, and having ends provided with crank and piston pin bosses; the said bosses consisting of sleeve-like members secured to the shell.

2. A one-piece sheet metal connecting rod shell having a shank with a single transverse wall, and having ends provided with crank and piston pin bosses; the said bosses consisting of sleeve-like members secured to the shell, and reinforced by flanges therearound.

3. A one-piece sheet metal connecting rod shell having a shank with a single transverse wall, and having an integral end provided with a crank pin boss and integral bolt bosses; said bolt bosses being stayed at opposite sides to said crank pin boss by additional members.

4. A sheet metal connecting rod shell comprising a shank with a single transverse wall, a piston pin boss comprising one end of the shell and having additional elements attached hereto to reinforce the end, and a pinch bolt boss for said piston pin boss.

HEBRON BERNARD LAYMAN.